US012783301B2

(12) United States Patent
Janke et al.

(10) Patent No.: US 12,783,301 B2
(45) Date of Patent: Nov. 3, 2026

(54) CONSERVING COMPUTING RESOURCES BY TIME SHIFTING ELECTRONIC ACTION REQUEST EXECUTION OPERATIONS

(71) Applicant: Truist Bank, Charlotte, NC (US)

(72) Inventors: Deepak Janke, Charlotte, NC (US); Murali Mohanan, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 414 days.

(21) Appl. No.: 18/589,585

(22) Filed: Feb. 28, 2024

(65) Prior Publication Data

US 2025/0272143 A1 Aug. 28, 2025

Related U.S. Application Data

(63) Continuation of application No. 18/589,532, filed on Feb. 28, 2024.

(51) Int. Cl.
*G06F 9/48* (2006.01)
*G06Q 20/10* (2012.01)

(52) U.S. Cl.
CPC ........... *G06F 9/4887* (2013.01); *G06Q 20/10* (2013.01)

(58) Field of Classification Search
CPC .............................. G06F 9/4887; G06Q 20/10
See application file for complete search history.

(56) References Cited

U.S. PATENT DOCUMENTS

2025/0004845 A1* 1/2025 Malvankar ............ G06F 9/5038

* cited by examiner

*Primary Examiner* — Wissam Rashid
(74) *Attorney, Agent, or Firm* — Nicholas Martin; Greenberg Traurig, LLP; Michael A. Springs

(57) ABSTRACT

A system for processing a request to execute an action by a future date is disclosed. The system may receive a request to execute an action by a future date and may thereafter provide information included in the request as input data to a trained machine-learning model configured to output a time-shifted target date on which one or more execution objects are available to execute the action. An application for future execution of the action may be generated and the time-shifted target date may be assigned thereto as a future action execution date. A draft status label may also be assigned to the application, which may thereafter be temporarily saved to a future action execution queue. The application may be retrieved from the future action execution queue on the future action execution date and submitted to the one or more execution objects for execution of the action.

20 Claims, 5 Drawing Sheets

CONSERVING COMPUTING RESOURCES BY TIME SHIFTING ELECTRONIC ACTION REQUEST EXECUTION OPERATIONS

CROSS-REFERENCE TO RELATED APPLICATIONS

This is a continuation of U.S. application Ser. No. 18/589,532, filed Feb. 28, 2024, and titled "CONSERVING COMPUTING RESOURCES BY TIME SHIFTING ELECTRONIC ACTION REQUEST EXECUTION OPERATIONS," the entirety of which is incorporated herein by reference.

TECHNICAL FIELD

The present disclosure relates generally to computing networks, and more particularly, although not exclusively, to conserving memory, processor, and user resources by time shifting electronic action request execution operations.

BACKGROUND

Action execution requests from an initiating party to a receiving party may be electronically sent on a routine basis for diverse purposes. An action execution request electronic message can include information that is useful to enable the computing networks of the receiving party to fulfill the request. Review and execution of requested actions can consume significant memory, processor, and user resources, particularly given that a receiving party can receive numerous action requests on a daily basis. Additionally, some requested actions may need to be executed immediately after initiation, or it may be otherwise prohibited or not possible for action initiation and execution operations to be independently scheduled. This can be problematic for resource planning. This may also lead to resource shortages and process inefficiencies, such as when there is variability in the volume of requested actions to be executed by the receiving party.

SUMMARY

According to one example of the present disclosure, a system may include a processor, and memory that is communicatively coupled to the processor and includes instructions that are executable by the processor to cause the processor to perform operations. The operations may include receiving, from an initiating party, a request to execute an action by a future date, the request to execute an action by a future date including action execution information. The operations may also include providing at least the action execution information and the future date as input data to a trained machine-learning model configured to generate an output indicating a time-shifted target date on which one or more execution objects are available to execute the action that is no later than the future date. The operations may additionally include generating an application for future execution of the action, and assigning thereto the time-shifted target date as a future action execution date. The operations may further include assigning a draft status label to the application for future execution of the action, and temporarily saving the application for future execution of the action to a future action execution queue. The operations may also include retrieving the application for future execution of the action from the future action execution queue on the future action execution date and submitting the application for future execution of the action to the one or more execution objects for execution of the action.

According to another example of the present disclosure, a computer-implemented method may include receiving, from an initiating party, by a receiving party, a request to execute an action by a future date, the request to execute an action by a future date including action execution information. The method may also include providing, by a processor, at least the action execution information and the future date as input data to a trained machine-learning model configured to generate an output indicating a time-shifted target date on which one or more execution objects are available to execute the action that is no later than the future date. The method may additionally include generating, by the processor, an application for future execution of the action, and assigning thereto the time-shifted target date as a future action execution date. The method may further include assigning, by the processor, a draft status label to the application for future execution of the action, and temporarily saving the application for future execution of the action to a future action execution queue. The method may also include retrieving, by the processor, the application for future execution of the action from the future action execution queue on the future action execution date and submitting the application for future execution of the action to the one or more execution objects for execution of the action.

According to a further example of the present disclosure, a non-transitory computer readable medium may contain instructions that are executable by a processor to cause the processor to perform operations. The operations may include receiving, from an initiating party, a request to execute an action by a future date, the request to execute an action by a future date including action execution information. The operations may also include providing at least the action execution information and the future date as input data to a trained machine-learning model configured to generate an output indicating a time-shifted target date on which one or more execution objects are available to execute the action that is no later than the future date. The operations may additionally include generating an application for future execution of the action, and assigning thereto the time-shifted target date as a future action execution date. The operations may further include assigning a draft status label to the application for future execution of the action, and temporarily saving the application for future execution of the action to a future action execution queue. The operations may also include retrieving the application for future execution of the action from the future action execution queue on the future action execution date and submitting the application for future execution of the action to the one or more execution objects for execution of the action.

DETAILED DESCRIPTION

Figure 1:
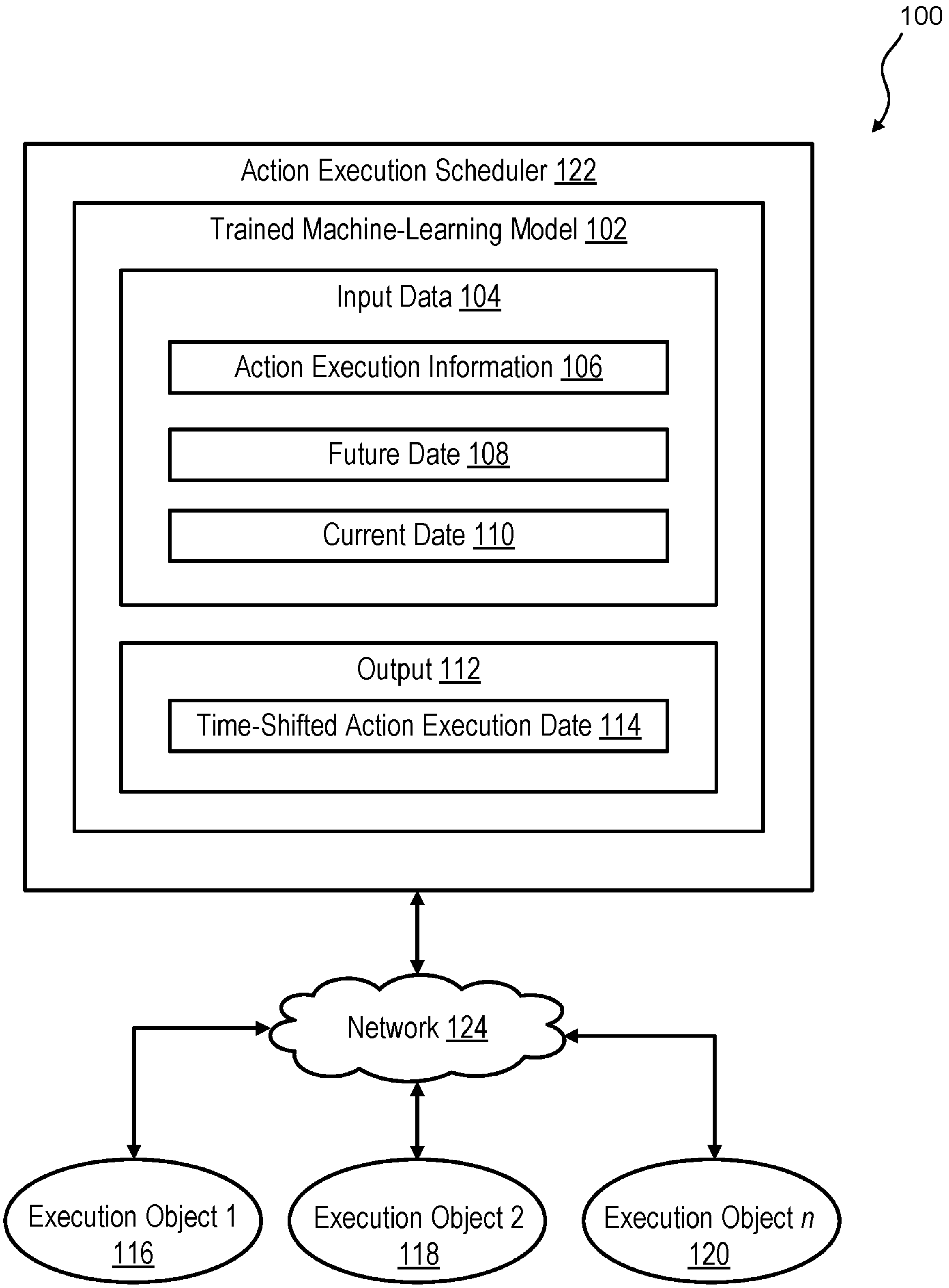
FIG. 1 is a block diagram of a machine-learning-based system for determining a time-shifted target date on which to execute a requested action, according to an example of the present disclosure.

Certain aspects and features of the present disclosure relate to a machine-learning-based system that can use time shifting to optimize computing resource utilization while addressing requests to execute an action by a future date in a timely manner. By employing time shifting, required action request information may be detected and stored by a system for later use. Employing time shifting can also allow action execution to be only partially undertaken, ahead of a desired or predicted date of actual action execution. The use of time shifting in cooperation with predictive machine-learning techniques can also reduce the amount of memory, processor, and user resources required to execute requested actions. For example, utilizing a trained machine-learning model to determine a time-shifted future date on which computing resources will be available to execute an action can reduce or eliminate scheduling and process inefficiencies, such as by improving workload distribution and resource management.

In some examples, a request to execute an action by a future date may be a wire transfer request. The wire transfer request may be associated with a value date, which is the date on or by which the funds associated with the wire transfer are expected to be released. In the case of wire transfers, the value date can be the initiation date of the request to perform an electronic operation. Wire transfers can be initiated and executed on the same day.

Some examples disclosed herein can employ time shifting to execute future actions. For example, a system can generate and execute future-dated wire transfers. A future-dated wire transfer may be a wire transfer with a value date that is after or later than the initiation date of the wire transfer (i.e., the value date is a future date). For example, a wire transfer that is initiated on a given day, may have a future value date that is two days later. The use of future-dated wire transfers can allow wire transfer processing entities to more efficiently use and balance resources by eliminating the requirement to initiate and execute a wire transfer on the same day. The use of future-dated wire transfers may also be more convenient for initiating parties.

Some examples disclosed herein can access training data and may train a machine-learning model on the training data to generate a trained machine-learning model. The training data may include data associated with one or more historical actions executed by one or more execution objects. The execution objects may be processors or other computing devices. The training data may also include historical utilization rate information for the execution objects. The trained machine-learning model can generate an output indicating a predicted time-shifted target date on which the execution objects will be available to execute the requested action. The time-shifted target date may be no later than the future date. The requested action can then be scheduled, such as by an action execution scheduler, for execution by the execution objects on the time-shifted target date.

In some examples, a system for executing an action request on a time-shifted basis can include multiple components and layers. Requests to execute an action may be received by the system via multiple different initiating channels. In some examples, an external request to execute an action by a future date may be transmitted over a network. In other examples, an external request to execute an action by a future date may be provided locally, such as by visiting a branch of a financial institution. A request to execute an action by a future date may also be an internal request, which can be made over a network or otherwise. For example, within a financial institution, a request to execute a future-dated wire transfer may emanate from an employee or a group or department of the financial institution.

These illustrative examples are provided to introduce the reader to the general subject matter discussed herein, and are not intended to limit the scope of the disclosed concepts. In the following description, various additional features and examples are described with reference to the drawings in which like numerals indicate like elements. Various implementations may be practiced without these specific details, and features can be combined together. The figures and description are not intended to be restrictive.

FIG. 1 is a block diagram illustrating one example of a machine-learning-based system 100 for determining a time-shifted target date on which to execute a requested action and scheduling the action for execution on the time-shifted target date. A request to execute an action may be associated with a future date. That is, the request may be a request to execute an action by a future date. In some examples, the requested action may be a wire transfer having an initiation date that is prior to an execution date (i.e., a future-dated wire transfer).

The system 100 may be a computing system 100 including various processing and other hardware and software or application components. The system 100 may be a stand-alone computing system, a server, or distributed computing system having multiple servers, virtual machines, etc. As depicted, the system 100 can include a trained machine-learning model 102. The trained machine-learning model 102 can be provided with input data 104. The input data 104 may include action execution information included in the request to execute an action. For example, when a request to execute an action by a future date is a future-dated wire transfer request, the action execution information may be a wire transfer amount, a future value date, and the intended recipient's name, address, account number, and routing number. Additional information (e.g., a bank SWIFT code) may be included if the request to execute an action corresponds to a permitted type of international wire transfer. The input data 104 can also include, among other things, the future date 108 associated with the request to execute the action, and the current date 110.

Based on the input data 104, the trained machine-learning model 102 can be configured to generate an output 112. The output 112 may be, or may include a time-shifted target date 114 on which one or more execution objects 116, 118, 120 are predicted to be available to execute the requested action. The time-shifted target date may be no later than the future date. Available to execute the requested action may mean that the utilization rate of a given one of the execution objects is predicted to be at a level that renders the given execution object able to execute the requested action within a predicted execution time. Available to execute the requested action can instead mean that the utilization rate of the execution objects is predicted to be at a level that renders the execution objects able to collectively execute the requested action within a predicted execution time.

The system 100 may also include an action execution scheduler 122 for scheduling the requested action for execution by the execution objects 116, 118, 120 on the time-shifted target date. In some examples, the action execution scheduler 122 can include the trained machine-learning model 102. The action execution scheduler 122 may be a computer program that is executable by a processor. The trained machine-learning model 102 may be a module of the action execution scheduler 122. The action execution scheduler 122 may be communicatively coupled to the execution objects 116, 118, 120 at least for purposes of scheduling the requested action for execution by the execution objects 116, 118, 120. For example, the action execution scheduler 122 may be communicatively coupled to the execution objects 116, 118, 120 via a network 124. The network 124 can be a local area network (LAN), a wide-area network (WAN) such as the Internet, an institutional network, cellular or other wireless networks, virtual networks such as an intranet or an extranet, etc.

The system 100 may be associated with a receiving party, which can be a party that receives a request to execute an action by a future date from an initiating party.

Figure 2:
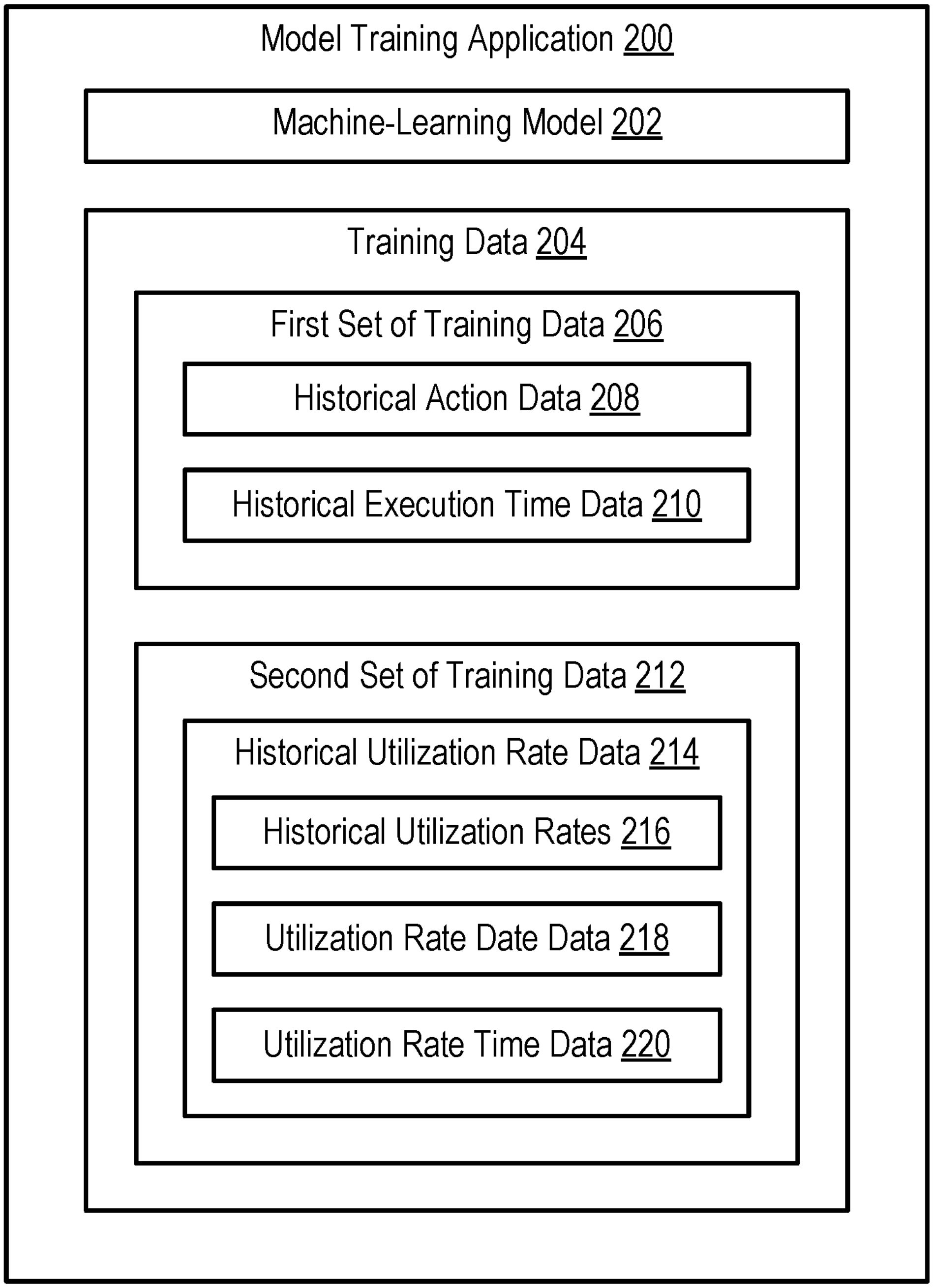
FIG. 2 is a block diagram of an application for training the machine-learning model of FIG. 1, according to an example of the present disclosure.

FIG. 2 is a block diagram of an example of a model-training application 200 that can train a machine-learning model 202 to generate a trained machine-learning model, such as the trained machine-learning model 102 of FIG. 1. The model-training application 200 can be part of the system 100 of FIG. 1, or the model-training application 200 may be separate and remote from the system 100 but communicatively coupled thereto. Training the machine-learning model can transform the machine-learning model from an untrained state to a trained state (i.e., to a trained machine-learning model). Training the machine-learning model is not limited to any particular model training technique. For example, a processor can provide training data to the machine-learning model in an iterative manner to enable the machine-learning model to identify trends or relationships in the training data. The machine-learning model may be trained in a supervised manner, an unsupervised manner, or a semi-supervised manner. Additionally, training the machine-learning model can involve adjusting a parameter or a hyperparameter of the machine-learning model to minimize a loss function of the machine-learning model.

Training the machine-learning model can include accessing training data that includes historical action execution data associated with one or more execution objects that can be used to execute a requested action. Training the machine-learning model can further include accessing historical utilization rate data associated with the execution objects. The training data can then be provided as input to the machine-learning model. Various fitting, estimation, or other model-training optimization techniques can be used to ensure that, upon evaluation, the predictive output of the machine-learning model is accurate given the input data (i.e., to minimize the loss function). The resulting trained machine-learning model can then be deployed for application to newly received input data.

In some examples, the training data 204 can be stored in a data repository that can be accessed by the model-training application 200. As shown, the training data 204 can include a first set of training data 206 and a second set of training data 212. In one example, the first set of training data 204 may include historical action data 208 associated with one or more historical actions executed by execution objects, such as the execution objects 116, 118, 120 of FIG. 1. The execution objects may be one or more processors of a computing system (e.g., system 100), which may be a desktop or laptop computer, a mobile device, etc. The execution objects may also be one or more servers, which can be arranged in a distributed or cloud architecture. A virtual machine may also function as an execution object.

The historical action data 208 may identify the specific types of actions that were executed by the execution objects and may also contain other action parameter information. For example, the historical action data 208 may include dates and times of action executions. The first set of training data 206 may also comprise historical execution time data 210, which can provide execution object execution times for the historical actions included in the historical action data 208. That is, the historical execution time data 210 can indicate the time required, historically, for the execution objects 116, 118, 120 to execute different types of actions in the past.

The second set of training data 212 may include execution object historical utilization rate data 214. The historical utilization rate data 214 can provide a snapshot of past execution object processing activity and usage. The historical utilization rate data 214 can be used to train a machine-learning model 202 to predict future execution object utilization rates and related action execution availability.

The historical utilization rate data 214 may include historical utilization rates 216 for the execution objects 116, 118, 120. In one example, the execution object utilization rate data 214 may indicate the percent utilization of the execution objects 116, 118, 120 at a past time or over a past time period. The execution object historical utilization rates 216 may be presented as an average execution object utilization rate per some past period of time. The execution object historical utilization rate data 214 may also include particular workload information, execution object processing speeds, or other factors that may have influenced the execution object historical utilization rate(s). The historical utilization rate data 214 may further include date data 218 and time data 220 that is associated with the historical utilization rates 216 for the execution objects. The date data 218 and the time data 220 can indicate the historical utilization rate(s) of the execution objects 116, 118, 120 at particular past dates and times. Training the machine-learning model using the historical date and time data may allow the trained machine-learning model to predict with more specificity a time-shifted target date on which the execution objects 116, 118, 120 are available to execute a requested action.

The historical actions performed, along with the historical execution times associated with those actions, and the historic utilization rates, may differ across the execution objects 116, 118, 120. An execution object identifier can be assigned to each execution object 116, 118, 120 to allow the training data 204 used to train the machine-learning model 202 to be associated with a given one of the execution objects 116, 118, 120. For example, the first set of training data 206 may include historical execution times 210 for each of the execution objects 116, 118, 120. A given historical execution time of the historical execution times 210 may be associated with a given execution object 116, 118, 120 by the execution object identifier. Similarly, the historical utilization rate data 214 in the second set of training data 212 may include utilization rates for each execution object 116, 118, 120. A given utilization rate of the utilization rate data 214 may be associated with a given execution object 116, 118, 120 by the execution object identifier. In some examples, data within the first set of training data 206 and data within the second set of training data 212 that is associated with given execution object 116, 118, 120 may be provided in separate datasets or sub-datasets. This can further facilitate association of the training data 204 with particular ones of the execution objects 116, 118, 120.

As described with respect to FIG. 1, the trained machine-learning model 102 can generate, based on the input data 104, an output 112 that includes a time-shifted target date on which the execution objects 116, 118, 120 are available to execute the requested action. The time-shifted target date may be determined by the trained machine-learning model 102 based on a predicted execution time for the requested action and a predicted utilization rate of the execution objects 116, 118, 120 during a time period between the current date and the future date specified in the request to execute the action. In some examples, the trained machine-learning model 102 may determine the time-shifted target date based on the predicted availability of a given one of the execution objects 116, 118, 120 to execute the action within the predicted execution time by the future date. In some examples, the trained machine-learning model 102 may determine that none of the individual execution objects 116, 118, 120 are able to individually execute the action within the predicted execution time by the future date. In such a case, the time-shifted target date may be based on the predicted availability of the execution objects 116, 118, 120 to collectively execute the action within the predicted execution time by the future date. When the time-shifted target date is based on the predicted availability of a given one of the execution objects 116, 118, 120 to execute the action within the predicted execution time, the execution object selected to execute the action may be the execution object that is predicted to have the lowest execution time. Alternatively, the execution object selected to execute the action may be the execution object that is predicted to have the lowest utilization rate on the time-shifted target date.

In another example, the trained machine-learning model 102 may recognize and act on patterns identified within received input data 104. For example, within the input data 104 provided to the trained machine-learning model 102 over time may be action execution information or other information related to recurring action execution requests initiated by a particular initiating party relative to a particular receiving party. For example, the input data 104 may include information associated with recurring requests for wire transfer payments from a particular initiating party to a particular receiving party. The trained machine-learning model 102 may recognize a pattern of such recurring action execution requests (e.g., transaction requests) and may generate an output as a result. For example, when the trained machine-learning model 102 recognizes a pattern of recurring transactions from one party to another party, the trained machine-learning model 102 may prompt the initiating party to create a prepopulated template that can be used to simplify future transactions between the parties. Alternatively, the trained machine-learning model 102 may generate such a template. In either case, the use of such a template can significantly reduce the number of repetitive manual information entries that will need to be made by the initiating party relative to future wire transfer requests.

In another example, the trained machine-learning model 102 may take other actions based on recognized patterns identified within received input data 104. For example, when the trained machine-learning model 102 recognizes within the input data 104 a pattern of recurring action execution requests (e.g., transaction requests) from a particular initiating party to a particular receiving party, the trained machine-learning model 102 may predict the timing of future action execution requests from the same initiating party to the same receiving party. Such predictions may be used, for example, to provide notifications to the initiating party or the receiving party, or may be used in further support of allocating computing resources.

A machine-learning model can be trained by the model training application 200 to generate a trained machine-learning model that can recognize patterns such as recurring transactions within the input data 104. Training a machine-learning model to recognize patterns such as recurring transactions is not limited to any particular model training technique. For example, the machine-learning model may again be trained in a supervised manner, an unsupervised manner, or a semi-supervised manner, and the training may involve adjusting a parameter or a hyperparameter of the machine-learning model to minimize a loss function of the machine-learning model.

Figure 3:
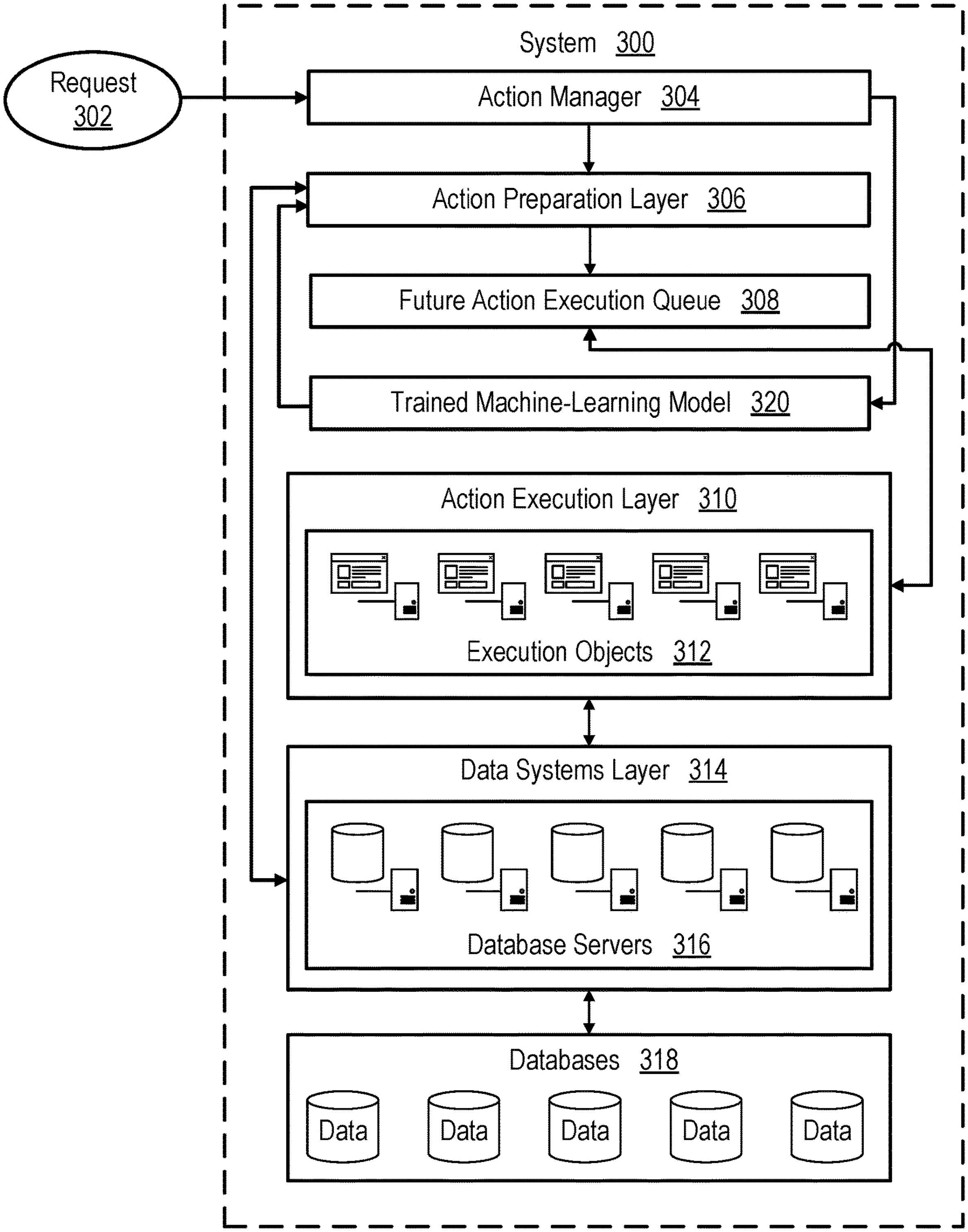
FIG. 3 is a block diagram of a machine-learning-based system for receiving an action execution request and submitting the action execution request for execution on a determined time-shifted target date, according to an example of the present disclosure.

FIG. 3 is a block diagram of a machine-learning based system 300 for receiving a request 302 to execute an action by a future date and submitting the action for execution on a determined time-shifted target date. The system 300 may be suitable, for example, to execute future-dated wire transfers. The system 300 may be a distributed system whereby the action execution functions of the system can be distributed across multiple applications or programs. The system 300 may be a cloud-based system. The multiple applications or programs may be distributed across and operate on multiple physical or virtual servers. The architecture of the system 300 is provided as an example. While FIG. 3 depicts the system 300 as including certain components, other examples may involve more, fewer, or different components than are shown in FIG. 3.

A request 302 to execute an action by a future date may be received from an initiating party of multiple possible initiating parties over a submission channel of various possible submission channels. The request 302 to execute an action by a future date may be received in the form of an electronic message. An initiating party may remotely submit a request to execute an action by a future date over a network. The network may be without limitation, a local area network (LAN), a wide-area network (WAN) such as the Internet, an institutional network, cellular or other wireless networks, virtual networks such as an intranet or an extranet, etc. Alternatively, an initiating party may submit a request to execute an action by a future date locally, such as a request to execute a future-dated wire transfer that is made through a branch of a financial institution. It is possible in this case, that an agent of the party receiving the request may receive required information from the initiating party and input the information into the system 300. Also alternatively, an initiating party may be internal to a receiving party. For example, when the receiving party is an entity such as a financial institution, the initiating party may be an employee, a group, or a department of the financial institution.

As shown, the system 300 of this example can include an action manager 304. A request 302 to execute an action at a future date may be received by the action manager 304 from an initiating party. In some examples, the action manager 304 may receive numerous requests 302 to execute future actions from different initiating parties via multiple channels within a short period of time. The action manager 304 may be responsible for managing the flow of data within the system 300, and for monitoring operations of the various components of the system 300. In this regard, the action manager 304 may be communicatively coupled to other components or layers of the system 300, as is illustrated generally in FIG. 3.

The system 300 may also include an action preparation layer 306. The action preparation layer 306 can receive a request to execute an action by a future date from the action manager 304. Communications between the action manager 304 and the action preparation layer 306 may be, but are not required to be, electronic messages. For a given request to execute an action by a future date, the action manager 304 may convey to the action preparation layer 306, the action execution information previously received by the action manager 304 with the request 302 from the initiating party.

The action preparation layer 306 can perform various functions related to future execution of an action. For example, the action preparation layer 306 can use the action execution information to generate an application for future execution of the action. When the action is a future-dated wire transfer, a generated application for future execution of the action may be a wire transfer application containing the information required for approval and execution of the future-dated wire transfer. In other examples, the action execution application may have another electronic format that is readable by the system 300.

The action preparation layer 306 may also be communicatively coupled to one or more databases, such as the databases 318. In some examples, the action preparation layer 306 may be communicatively coupled to the one or more databases 318 through one or more database servers 316 of a data systems layer of the system 300. The databases 318 may contain additional information related to a request to execute an action by a future date. For example, when the action is a future-dated wire transfer, the additional information may be party information, account information, financial institution information, etc. In this manner, the action preparation layer 306 can retrieve information that is required for approval and execution of the future action, but is missing from the action execution information received from the action manager 304. Likewise, the action preparation layer 306 may retrieve information that is required for approval and execution of the future action, but is missing from the action execution information received by the action manager 304 with the request to perform an action by a future date.

Once an application for future execution of the action has been generated by the action preparation layer 306, the action preparation layer 306 may assign a draft status label to the application for future execution of the action. The draft status label can indicate to the system 300 that the action reflected in the application for future execution of the action is pending execution on or by a future date.

Subsequent to generating and assigning a draft status to the application for future execution of the action, the system 300 (e.g., the action preparation layer 306) can temporarily store or move the application for future execution of the action to a future action execution queue 308 of the system 300. In some examples, future action execution queues 308 may be present. When future action execution queues 308 are present, saving a given application for future execution of the action to a given future action execution queue 308 may be governed by certain criteria. For example, a given future action execution queue 308 may be associated with a given channel over which a request 302 to execute an action by a future date is received. Alternatively, a given future action execution queue 308 may be associated with a given initiating party. Applications for future execution of an action corresponding to requests 302 to execute actions by future dates received over the given channel or from the given initiating party can then be automatically saved to the associated future action execution queue 308.

Application for future execution of an action may reside in the future action execution queue 308 for some period of time. For example, an application for future execution of an action may reside in the future action execution queue 308 until it is retrieved for subsequent downstream approval and execution of the associated action, or until a future action execution date passes without retrieval. In at least some examples, there may be a limit on the amount of time that is permitted between a future action execution date and an associated action request initiation date or the generation date of an application for future execution of an action. For example, when the future action is a wire transfer, the future value date associated with the request 302 to execute the wire transfer may be limited to no more than three business days after the date that an application for future execution of the action is generated for the request. In some examples, an application for future execution of an action that remains in the future action execution queue 308 after the future action execution date associated therewith has passed can be deleted. Deleting expired applications for future execution of an action can conserve memory resources associated with storing the applications. Deleting expired applications for future execution of an action can also conserve processor resources by reducing the number of applications that must be sorted through.

In some examples, an application for future execution of an action, and the action execution information or other information contained in the application for future execution of an action, can be modified while the application resides in the future action execution queue 308. For example, updated user (e.g., initiating party) information may be received after the application for future execution of an action is generated and saved in the future action execution queue 308, and the application for future execution of an action may be modified accordingly. Other information (e.g., a wire transfer amount) related to the request to execute an action by a future date may be similarly modified. Conversely, it may be desirable, or necessary for compliance or other reasons, to prohibit the modification of certain information contained in an initial request. For example, when the request is a future-dated wire transfer request, modification of a source account number provided with the initial future-dated wire transfer request may be prohibited while the application for future execution of an action resides in the future action execution queue 308. A modification of the source account number may instead be prohibited any time after the application for future execution of an action is generated.

The system 300 can additionally include an action execution layer 310 for executing time-shifted actions. In this example of the system 300, the action execution layer 310 includes one or more execution objects 312. The execution objects 312 may be action execution servers. The number and location of the execution objects 312 may vary depending on the specific design of the system 300. For example, the execution objects 312 may be arranged in a distributed server architecture, in which case at least some of the execution objects 312 can reside in different locations, or the execution objects 312 may be physical or virtual servers of a cloud-based system. The various execution objects 312 may communicate with other layers of the system 300 and with each other over one or more networks.

One or more applications can operate on each of the execution objects 312, such as but not limited to, transaction processing applications for processing different types of wire transfers. In some examples, a given execution object of the execution objects 312 may be configured to run an application or multiple applications specific to processing a particular type of action—e.g., international (SWIFT) wire transfers when the action is a wire transfer. In other examples, a given execution object of the execution objects 312 may be configured to run multiple applications that allow the given execution object to process different types of actions—e.g., domestic (FedWire) and international (SWIFT) wire transfers when the action is a wire transfer. Combinations of such execution object configurations may also be employed in some system examples.

The system 300 can further include the data systems layer 314. In this example of the system 300, the data systems layer 314 includes the database servers 316. As with the execution objects 312, the number and location of the database servers 316 may vary depending on the specific design of the system 300. For example, the database servers 316 may be arranged in a distributed server architecture or a cloud-based architecture. In a distributed server architecture, at least some of the database servers 316 can reside in different locations, with the various database servers 316 communicating with other layers of the system 300 and with each other over one or more networks.

Each of the database servers 316 may be in communication with one or more of the databases 318. The database servers 316 may retrieve action-related data from, or store action-related data to, the databases 318 as needed during the execution of time-shifted actions. The database servers 316 may also communicate with the execution objects 312 of the action execution layer 310, or with the action preparation layer 306, as needed during the execution of a time-shifted action.

At least the action manager 304, the action preparation layer 306, and the action execution layer 310 of the system 300, may each include applications that cooperate to form separate processing pipelines. The respective processing pipelines can respectively execute time-shifted actions or different types of time-shifted actions for which requests are received by the system 300 to process time-shifted actions efficiently and effectively.

Information received by the action manager 304 can also be provided to a trained machine-learning model 320 as input. The trained machine-learning model 320 may have been generated by previously training a machine-learning model on training data, such as in the manner described above. The training data may include, for example, historical action data associated with historical actions executed by the execution objects 312 and execution times for the one or more historical actions. The training data may also include historical utilization rate data for the execution objects 312, which may include execution object utilization rates, time data, and date data. In addition to the information received by the action manager 304, at least a future date accompanying the action execution request and the current date can be provided to the trained machine-learning model 320 as input. The trained machine-learning model 320 can thereafter generate an output identifying a time-shifted target date for execution of the requested action. On the time-shifted target date, the execution objects 312 are predicted to be available to execute the requested action. The time-shifted target date may be no later than the future date associated with the request. The time-shifted target date may be assigned to the application for future execution of an action as a future action execution date.

The system 300 can then schedule the requested action for execution by the execution objects 312 or submit the application for future execution of the action to the one or more execution objects for execution of the action on the future action execution date (i.e., on the time-shifted target date). In some examples, scheduling a requested action for execution or submitting the application for future execution of the action by the execution objects 312 may cause a corresponding application for future execution of the action to be retrieved from the future action execution queue 308 and to be provided to the action execution layer 310 of the system 300 for execution of the action by the execution objects 312. As part of this process, the system 300 can remove the draft status label from the application for future execution of the action. The application for future execution of the action may also be approved for execution by the action execution layer 310 or otherwise, prior to execution of the action.

Machine-learning-based system examples of the disclosure can be used to execute a requested action by a specified future date in an efficient and resource-conserving manner. System examples can use information about the past performance and utilization of one or more execution objects to predict a time-shifted (future) target date on which the execution objects will have individual or collective processing capacity to execute the action, and can also automatically schedule or submit the action for execution on the time-shifted target date. This can result in improved system workload balancing and a more efficient use of processing resources. In some examples, a warning or other notification can be issued if the system determines that none of the execution objects will be able to execute a given action by the associated future date. In the case of an action in the form of a wire transfer, the initial account balance validation check normally performed on the wire initiation date can be deferred by the system until the time-shifted target date determined by the trained machine-learning model of the system.

Figure 4:
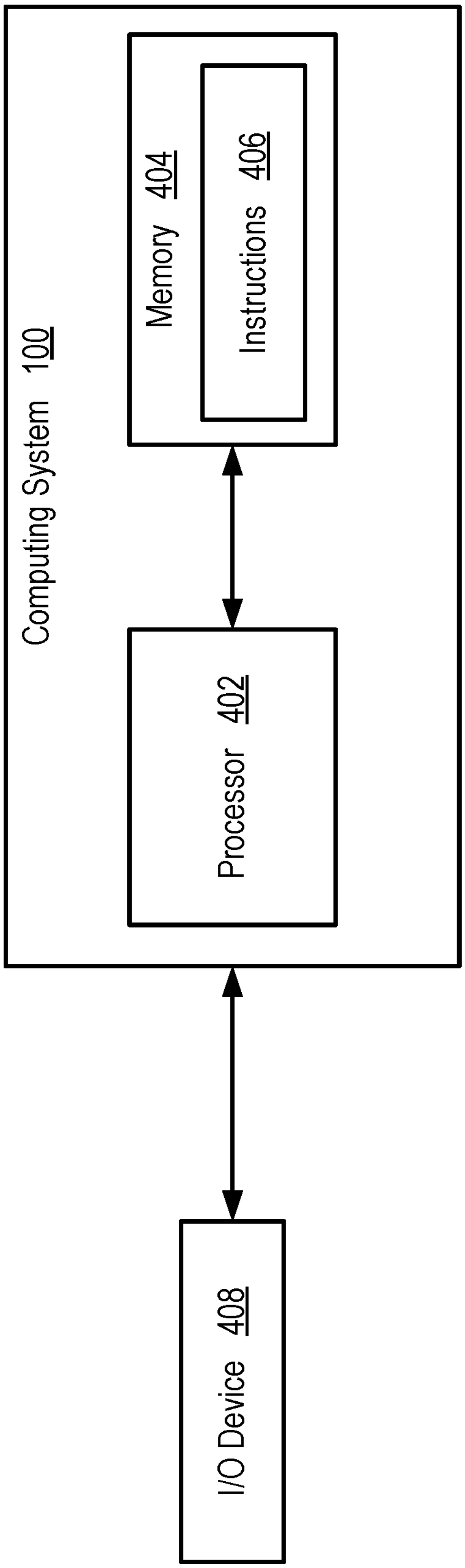
FIG. 4 is a block diagram illustrating various computing components of the machine-learning-based system of FIG. 1, according to an example of the present disclosure.

FIG. 4 is a block diagram illustrating various components of a computing system, such as the system 100 of FIG. 1, that is usable to schedule or submit an action for execution on a time-shifted target date determined by a trained machine-learning model. As illustrated, the computing system 100 may include a processor 402 that is communicatively coupled to a memory 404. The processor 402 can include one processing device or multiple processing devices. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. In some examples, the instructions 406 can include processor-specific instructions generated by a compiler or an interpreter from code written in a suitable computer-programming language, such as C, C++, C #, etc.

The memory 404 can include one memory or multiple memories. The memory 404 can be non-volatile and may include any type of memory that retains stored information when powered off. Non-limiting examples of the memory 404 include electrically erasable and programmable read-only memory (EEPROM), flash memory, or any other type of non-volatile memory. At least some of the memory 404 can be a non-transitory computer-readable medium from which the processor 402 can read the instructions 406. A computer-readable medium can include electronic, optical, magnetic, or other storage devices capable of providing the processor 402 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 402 can read the instructions 406. In some examples, the memory 404 may include the trained machine learning model.

The computing system 100 may additionally include one or more input/output (I/O) components. For example, the computing system 100 can include an I/O device 408 communicatively coupled to the computing system 100. Additionally, or alternatively, the computing system 100 can include other I/O components that are not shown for simplicity. Examples of input components can include a mouse, a keyboard, a trackball, a touch pad, a touch-screen display, etc. Examples of output components can include a visual display or an audio display. Examples of the visual display can include a liquid crystal display (LCD), a light-emitting diode (LED) display, or the touch-screen display. An example of the audio display can include speakers. In some cases, the I/O components can be integrated into a single structure that can be communicatively coupled to the computing system 100. For example, the I/O components may be positioned within the I/O device 408. In other examples, the I/O components can be distributed (e.g., in separate housings) and in electrical communication with each other and the computing system 100.

Figure 5:
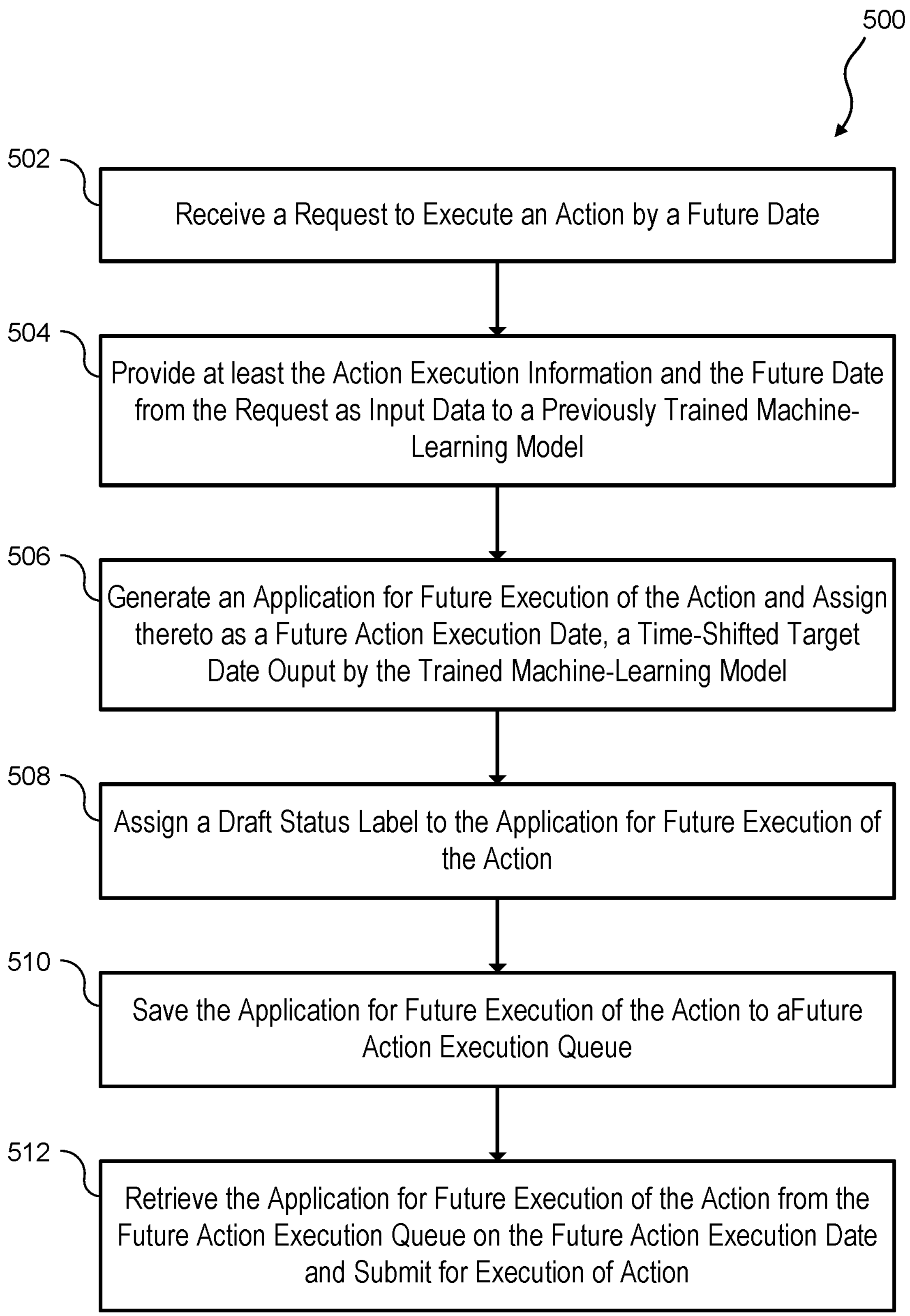
FIG. 5 is a flowchart of a computer-implemented method for submitting an action execution request for execution on a determined time-shifted target date, according to one example of the present disclosure.

FIG. 5 is a flowchart 500 of a computer-implemented method for submitting an action execution request for execution on a determined time-shifted target date, according to one example. The computer-implemented method may be performed by a machine-learning-based system, such as the system 300 described above. As represented in block 502, a request to execute an action by a future date may be received by a processor from an initiating party. The request may include various types of action execution information. For example, when the request to execute an action by a future date is a request to initiate a future-dated wire transaction, the request may include various action execution information, such as party information, account information, financial institution information, and a future value date.

At block 504, at least the action execution information and the future date may be provided by the processor as input data to a trained machine-learning model previously trained on training data that includes historical action data associated with historical actions executed by one or more execution objects and historical utilization rate data for the execution objects. The historical action data may have also included execution times for the historical actions. The historical utilization rate data may have also included time and date data. The trained machine-learning model may be configured to generate an output indicating a time-shifted target date on which one or more execution objects are available to execute the action that is no later than the future date.

At block 506, the processor may generate an application for future execution of the action, and may assign thereto the time-shifted target date output by the trained machine-learning model as a future action execution date. In some examples, the application for future execution of the action can be generated by an action preparation layer of the system, where the action preparation layer may be communicatively coupled at least to the trained machine-learning model to receive the time-shifted target date therefrom.

At block 508, the processor may assign a draft status label to the application for future execution of the action. The draft status label can indicate to the system that the action reflected in the application for future execution of the action is pending execution on or by a future date. The application for future execution of the action may thereafter be temporarily saved to a future action execution queue, as indicated at block 510. In some examples, the future action execution queue may be one of a plurality of future action execution queues of the system. When multiple future action execution queues are present, a given future action execution queue may be associated with a given channel over which a request to execute an action by a future date is received or may be associated with a given initiating party. In at least some examples, an application for future execution of an action that remains in the future action execution queue after the future action execution date associated therewith has passed can be deleted to conserve memory resources.

As represented in block 512, the processor may, on the future action execution date, retrieve the application for future execution of the action from the future action execution queue and submit the application to the one or more execution objects for execution of the action. In some examples, submitting the application for future execution of the action to the one or more execution objects for execution of the action can comprise transmitting the application for future execution of the action to an action execution layer of the system. The action execution layer of the system may host the one or more execution objects, which may include one or more applications that are configured to execute the action. In another example, submitting the application for future execution of the action to the one or more execution objects for execution of the action may comprise scheduling the requested action for execution by the execution objects on the time-shifted target date. In either case, the application for future execution of the action or the action embodied in the application for future execution of the action may be subjected to an approval process prior to actual execution of the action.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processor;

a memory communicatively coupled to the processor, the memory including instructions that are executable by the processor to cause the processor to perform operations comprising:

receiving, from an initiating party, a request to execute an action by a future date, the request to execute an action by a future date including action execution information;

providing at least the action execution information and the future date as input data to a trained machine-learning model configured to generate an output indicating a time-shifted target date on which one or more execution objects are available to execute the action that is no later than the future date;

generating an application for future execution of the action, and assigning thereto the time-shifted target date as a future action execution date;

assigning a draft status label to the application for future execution of the action, and temporarily saving the application for future execution of the action to a future action execution queue; and retrieving the application for future execution of the action from the future action execution queue on the future action execution date and submitting the application for future execution of the action to the one or more execution objects for execution of the action.

2. The system of claim 1, further comprising:
an action manager configured to receive the request to execute an action by a future date and to provide the input data to the trained machine-learning model;
an action preparation layer communicatively coupled to the action manager to receive the request to execute an action by a future date therefrom and communicatively coupled to the trained machine-learning model to receive the time-shifted target date therefrom, the action preparation layer configured to generate the application for future execution of the action and to assign the draft status label and the future action execution date thereto; and
an action execution layer communicatively coupled to the future action execution queue and hosting the one or more execution objects.

3. The system of claim 2, wherein the action manager, the action preparation layer, and the action execution layer each include applications that cooperate to form separate action execution pipelines.

4. The system of claim 1, wherein the initiating party is one of a plurality of possible initiating parties and the request to execute an action by a future date is receivable from the initiating party over a submission channel of various possible submission channels.

5. The system of claim 4, wherein the future action execution queue is associated with a given submission channel of the various possible submission channels or is associated with a given initiating party of the plurality of possible initiating parties.

6. The system of claim 1, wherein a given execution object of the one or more execution objects includes an application or multiple applications specific to processing a particular type of action.

7. The system of claim 1, wherein the request to execute an action by a future date is a request to initiate a future-dated wire transfer, and the action execution information is information required for approval and execution of the future-dated wire transfer.

8. A computer-implemented method comprising:
receiving, by a processor, from an initiating party, by a receiving party, a request to execute an action by a future date, the request to execute an action by a future date including action execution information;
providing, by a processor, at least the action execution information and the future date as input data to a trained machine-learning model configured to generate an output indicating a time-shifted target date on which one or more execution objects are available to execute the action that is no later than the future date;
generating, by a processor, an application for future execution of the action, and assigning thereto the time-shifted target date as a future action execution date;
assigning, by the processor, a draft status label to the application for future execution of the action, and temporarily saving the application for future execution of the action to a future action execution queue; and
retrieving, by the processor, the application for future execution of the action from the future action execution queue on the future action execution date and submitting the application for future execution of the action to the one or more execution objects for execution of the action.

9. The method of claim 8, wherein:
the initiating party is one of a plurality of possible initiating parties and the request to execute an action by a future date is received from the initiating party over a submission channel of various possible submission channels; and
the future action execution queue is associated with a given submission channel over which the request to execute an action by a future date is received or is associated with a given initiating party of the plurality of possible initiating parties.

10. The method of claim 9, wherein the draft status label is removed from the application for future execution of the action before the application for future execution of the action is submitted to the one or more execution objects for execution of the action.

11. The method of claim 8, wherein the receiving party is an entity and the initiating party is internal to the entity.

12. The method of claim 8, wherein the request to execute an action by a future date is received as an electronic message.

13. The method of claim 8, further comprising deleting an application for future execution of an action that remains in the future action execution queue after the future action execution date assigned to the application for future execution of the action.

14. The method of claim 8, wherein the request to execute an action by a future date is a request to initiate a future-dated wire transfer, and the action execution information is information required for approval and execution of the future-dated wire transfer.

15. A non-transitory computer-readable medium comprising instructions that are executable by a processor for causing the processor to perform operations comprising:
receiving, from an initiating party, a request to execute an action by a future date, the request to execute an action by a future date including action execution information;
providing at least the action execution information and the future date as input data to a trained machine-learning model configured to generate an output indicating a time-shifted target date on which one or more execution objects are available to execute the action that is no later than the future date;
generating an application for future execution of the action, and assigning thereto the time-shifted target date as a future action execution date;
assigning a draft status label to the application for future execution of the action, and temporarily saving the application for future execution of the action to a future action execution queue; and
retrieving the application for future execution of the action from the future action execution queue on the future action execution date and submitting the application for future execution of the action to the one or more execution objects for execution of the action.

16. The non-transitory computer-readable medium of claim 15, further comprising:
an action manager configured to receive the request to execute an action by a future date and to provide the input data to the trained machine-learning model;
an action preparation layer communicatively coupled to the action manager to receive the request to execute an action by a future date therefrom and communicatively coupled to the trained machine-learning model to receive the time-shifted target date therefrom, the action preparation layer configured to generate the application for future execution of the action and to assign the draft status label and the future action execution date thereto; and an action execution layer communicatively coupled to the future action execution queue and hosting the one or more execution objects.

17. The non-transitory computer-readable medium of claim 16, wherein the action manager, the action preparation layer, and the action execution layer each include applications that cooperate to form separate action execution pipelines.

18. The non-transitory computer-readable medium of claim 15, wherein the initiating party is one of a plurality of possible initiating parties and the request to execute an action by a future date is receivable from the initiating party over a submission channel of various possible submission channels.

19. The non-transitory computer-readable medium of claim 18, wherein the future action execution queue is associated with a given submission channel of the various possible submission channels or is associated with a given initiating party of the plurality of possible initiating parties.

20. The non-transitory computer-readable medium of claim 15, wherein the request to execute an action by a future date is a request to initiate a future-dated wire transfer, and the action execution information is information required for approval and execution of the future-dated wire transfer.

* * * * *